United States Patent
Ernst et al.

(10) Patent No.: US 6,467,453 B1
(45) Date of Patent: Oct. 22, 2002

(54) METHOD OF PRODUCING A MIXTURE IN THE COMBUSTION CHAMBER OF AN INTERNAL COMBUSTION ENGINE

(75) Inventors: Johannes Ernst, Baden-Baden; Jens Froehlich, Loerrach; Deborah Mowll, Esslingen; Klaus Roessler, Altbach; Guido Vent, Oppenweiler, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/622,215
(22) PCT Filed: Nov. 3, 1999
(86) PCT No.: PCT/EP99/08392
§ 371 (c)(1),
(2), (4) Date: Sep. 26, 2000
(87) PCT Pub. No.: WO00/36292
PCT Pub. Date: Jun. 22, 2000

(30) Foreign Application Priority Data

Jun. 15, 1998 (DE) .......................... 198 57 785

(51) Int. Cl.$^7$ .................................................. F02B 1/06
(52) U.S. Cl. ........................................................ 123/299
(58) Field of Search ................................ 123/299, 295, 123/300

(56) References Cited

U.S. PATENT DOCUMENTS 4,621,599 A * 11/1986 Igashira et al. ............. 123/300
5,713,328 A 2/1998 Anderson et al. ........... 123/299
5,740,776 A 4/1998 Enderle et al. .............. 123/299
6,067,954 A * 5/2000 Kudou et al. ................ 123/295

FOREIGN PATENT DOCUMENTS

| EP | 0 621 400 A1 | 10/1994 |
| EP | 0 661 432 A2 | 7/1995 |
| EP | 0 786 592 A1 | 7/1997 |

* cited by examiner

Primary Examiner—Gene Mancene
Assistant Examiner—Arnold Castro
(74) Attorney, Agent, or Firm—Crowell & Moring LLP

(57) ABSTRACT

In a method for forming the mixture in a combustion space of an internal combustion engine, fuel is injected into the combustion space with a varying fuel mass flow during an operational cycle of the internal combustion engine. In one embodiment at least under certain engine operating conditions, three-stage fuel injection is carried out during the compression phase so that a main fuel quantity is injected in a first injection step, an additional fuel quantity with a reduced fuel mass flow is injected in a second injection step and an ignition fuel quantity is injected in a third injection step. In another embodiment, a fuel quantity is injected with a fuel mass flow which is reduced so that it falls steadily from a maximum initial value down to zero and, in accordance with a third method, a fuel quantity is injected during the induction phase with a fuel mass flow which is, at least at times, proportional to the air mass flow.

6 Claims, 1 Drawing Sheet

METHOD OF PRODUCING A MIXTURE IN THE COMBUSTION CHAMBER OF AN INTERNAL COMBUSTION ENGINE

BACKGROUND AND SUMMARY OF THE INVENTION

This application claims the priority of Germany Patent Document 198 57 785.0, filed Jun. 15, 1998 and European PCT/EP99/08392 file Nov. 3, 1998, the disclosures of which are expressly incorporated by reference herein.

The invention relates to a method for forming the mixture in a combustion space of an internal combustion engine, in which fuel is injected into the combustion space with a varying fuel mass flow during an operational cycle of the internal combustion engine.

A method of forming an ignitable fuel/air mixture in the cylinders of a direct-injection internal combustion engine is disclosed in German patent document DE 196 42 953 C1. In this method, fuel is injected into each combustion space by means of an injection valve with a variably adjustable opening lift. The valve lift is adjusted as a function of the operating condition of the engine; in particular as a function of the engine speed, the induction mass flow, supercharging, emissions and/or the smooth running of the internal combustion engine. Provision is also made for varying the opening lift of the injection during the injection procedure and, in fact, either by means of a brief increase in the opening lift in a central region of the injection period or by means of a dynamic reduction in the opening lift from a large initial value at the beginning of the fuel injection to a reduced final value, at the end of the fuel injection. The dynamic reduction in the opening lift takes place in accordance with an inverse exponential function, the major proportion of the metered fuel quantity being injected at a high fuel mass flow at the beginning of the injection period into the combustion space.

In method of operating an internal combustion engine disclosed in German patent document DE 196 02 065 A1, a main fuel quantity is first injected into a piston combustion space during a compression stroke phase and, after an injection pause of a duration which can be fixed, an ignition fuel quantity is injected into the piston combustion space. This achieves layering of the charge of injected fuel, the two mixture clouds overlapping or bounding one another at the time of ignition.

In internal combustion engine known from German patent document DE 195 30 072 A1, engine fuel is injected into a combustion space in two partial quantities, the first (and larger) mixture quantity being separated from the second (smaller mixture) quantity at the time of ignition. Injection of the first fuel partial quantity takes place during the induction stroke whereas the second fuel partial quantity is injected and ignited in a separate combustion space section in the expansion phase.

One object of the present invention is to provide a method for forming a mixture in a combustion space of an internal combustion engine, which method achieves an improved operating behaviour of the internal combustion engine, by special configuration of the injection procedure.

This and other objects and advantages are achieved by the method according to the invention, which provides for a three-stage fuel injection in which an additional fuel quantity is interposed between a main fuel quantity and an ignition fuel quantity. Due to injection of the additional fuel quantity between the main fuel injection and the ignition fuel injection, the time for the beginning and ending of the injections of the main fuel quantity and the ignition fuel quantity can be selected in a more flexible manner. A small fuel quantity at a relatively low fuel mass flow (i.e., with a small opening of the injection valve), is preferably injected into the combustion space as the additional fuel quantity. The main fuel quantity and ignition fuel quantity are connected in such a way that reliable ignition of the main fuel quantity takes place.

In one embodiment of the invention, the main flow quantity and the ignition fuel quantity are injected into the combustion space at a fuel mass flow which is large and essentially of equal magnitude (i.e., the same opening position of the injection valve). In this arrangement, an injection valve control system drives the injection valve into only two different opening positions. The method can therefore be effected in a particularly simple manner.

Another embodiment of the invention provides for a fuel injection whose fuel mass flow is lowered steadily from a (non zero) maximum initial value down to zero. In this arrangement, the injection valve is closed slowly, either continuously or in steps, and a variation of the air/fuel ratio in the mixture cloud from rich to weak is achieved. This technique ensures that an ignitable mixture with a favourable fuel distribution is present at some position of the mixture cloud at a certain time.

In a further embodiment of the invention, the injection valve is transferred from an open position into a closed position continuously, or in steps of preferably equal magnitude, so that the fuel mass flow correspondingly decreasing to zero.

Finally, in yet another embodiment, fuel is injected as a function of the mass flow of the combustion air flowing into the combustion space. In this arrangement, the fuel mass flow is, at least at times, proportional to the air mass flow so that an approximately constant air/fuel ratio is achieved in a region of the combustion space. For this purpose, the needle lift of the injection valve, in particular, is matched to the movement of the air inlet valve.

Other objects, advantages and novel features of the present invention will become apparent from the following detailed description of the invention when considered in conjunction with the accompanying drawings.

BRIEF DESCRIPTION OF THE DRAWINGS

FIG. 1b is a time diagram, which shows actual needle lift variation during the method in accordance with FIG. 1a;

FIG. 2b is a time diagram that shows an actual needle lift variation during the method in accordance with FIG. 2a.

DETAILED DESCRIPTION OF THE DRAWINGS

Figure 1A:
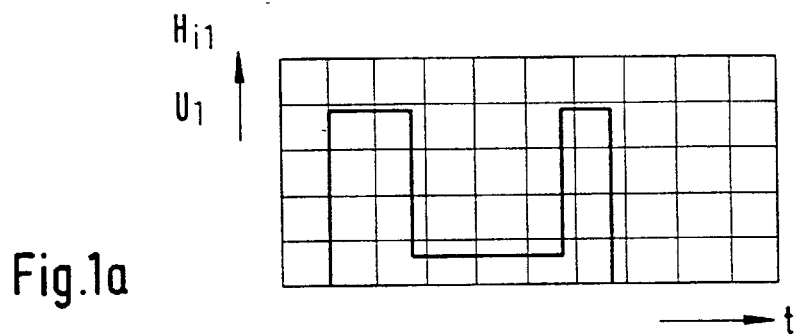
FIG. 1a is, in a time diagram which shows, the variation of the required value of a drive voltage, or the ideal needle lift variation proportional to it, of an injection valve of an internal combustion engine during a first example of the method in accordance with the invention.

An exemplary internal combustion engine in the form of a reciprocating-piston, spark-ignition engine has a plurality of working cylinders, each having a combustion space with which are associated at least one air inlet valve, at least one exhaust valve, a fuel injection valve for direct injection of fuel into the combustion space and a sparking plug for igniting the injected fuel. During an induction or compression stroke of the reciprocating piston, finely atomized fuel is injected into the induced combustion air by means of the injection valve in order to form an air/fuel mixture (so-called internal mixture formation). Particularly in the case of the so-called jet-controlled combustion process, it is necessary for an ignitable air/fuel mixture to be present in the region of the spark plug at the time of ignition. Injection into the compression stroke is secured by an appropriate arrangement of the plug in the region of the injection jet of the injection valve. Essential criteria for optimum combustion of the injected fuel are the ignition stability and the complete combustion of the injected fuel so that carbonization within the combustion space, cyclic fluctuations and increased pollutant emissions are avoided. The examples described below of the method for forming the mixture in a combustion space are suitable for this purpose and these examples can, for example, be alternatively employed during the operation of the internal combustion engine as a function of the load condition of the engine.

In accordance with a first example of the method in accordance with the invention, the fuel quantity injected into the combustion space of a cylinder during the operational cycle is subdivided into three partial quantities: a main fuel quantity, an ignition fuel quantity and an additional fuel quantity. The main fuel quantity is injected into the combustion space during a first injection step to form a first mixture cloud, this injection step preferably taking place at the beginning of the compression phase of the reciprocating piston guided in the working cylinder. The beginning of the injection step mentioned can, in a modified method, have been already provided during the induction phase.

In a second injection step, which follows on directly from the first (i.e. without interrupting the injection), an additional fuel quantity is injected into the combustion space with a fuel mass flow which is smaller than the fuel mass flow provided in the first injection step.

Finally, in a third injection step, which again follows directly the second, the ignition fuel quantity is injected into the combustion space with a fuel mass flow which is larger than the fuel mass flow provided in the second injection step. The ignition fuel quantity forms a second mixture cloud which is ignited by the sparking plug to initiate the combustion process and has, for this purpose, an approximately stoichiometric air/fuel mixture.

The additional fuel quantity, whose magnitude depends on the time and space interval between the first mixture cloud and the second mixture cloud, connects these two mixture clouds together so that these can be injected into the combustion space independently of one another. The additional fuel quantity ensures reliable transfer of the ignition from the ignition fuel quantity to the main fuel quantity and is, otherwise, selected to be as small as possible.

Figure 1B:
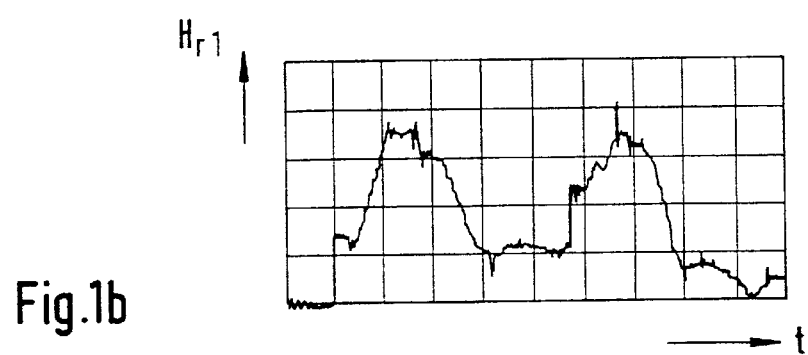

The three-stage fuel injection proposed provides an increased configuration range for optimizing the mixture formation and the combustion location. FIG. 1 shows, as an example, the variation with time t of a drive voltage $U_1$ of an electromagnetically actuated injection valve of the internal combustion engine while the first method mentioned is being carried out. This voltage $U_1$ is proportional to the ideal needle lift $H_{i1}$ of the injection valve. FIG. 1b shows actual variation of the needle lift $H_{r1}$ during the associated injection procedure.

Figure 2A:
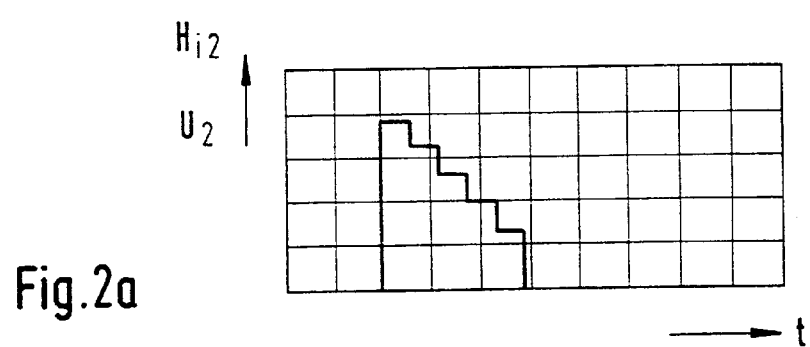
FIG. 2a is a time diagram showing, the variation of the required value of a drive voltage (or the ideal needle lift variation proportional to it) of an injection valve of an internal combustion engine during a second example of the method in accordance with the invention.
Figure 2B:
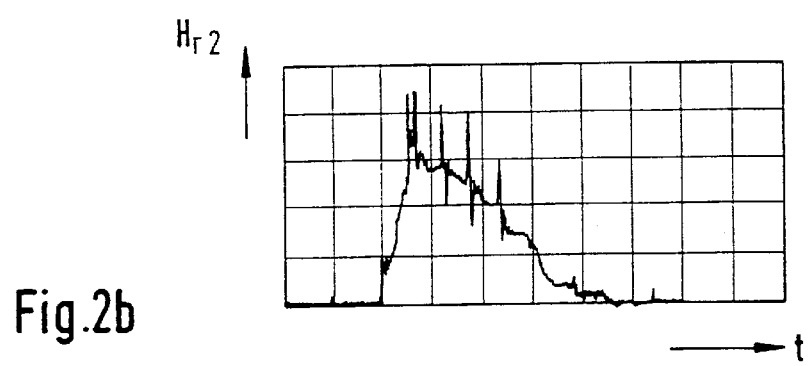

In a second example of the method according to the invention for forming the mixture in a combustion space of the internal combustion engine, fuel is injected into the combustion space by means of the injection valve, with a steadily falling fuel mass flow during an operational cycle of the internal combustion engine. The fuel is preferably injected after the beginning of the compression phase, the fuel mass flow being reduced from a maximum initial value and falling to zero. The falling fuel mass flow is achieved by slowly closing the injection valve. On this point, the drive voltage $U_2$ of an electromagnetically actuated injection valve of the internal combustion engine is shown, as an example, against the time t in FIG. 2a, this voltage $U_2$ being approximately proportional to the ideal variation $H_{i2}$ of the needle lift of the injection valve. The actual variation $H_{r2}$ of the needle lift of the injection valve against the time t during the associated injection procedure is shown in FIG. 2b. It may be seen from FIGS. 2a and 2b that, because of the inertia of the injection valve and because of its drive by means of a step-shaped reduction of the drive voltage $U_2$, an approximately continuous closing of the injection valve can be achieved. Because of the slow closing of the injection valve, an air/fuel ratio which varies continuously from rich to weak occurs in the mixture cloud generated. This, particularly in the case of high load requirements, makes it possible to ensure that an ignitable air/fuel mixture is present at the desired ignition time at a location in the mixture cloud.

In a third example of the method according to the invention for forming the mixture in a combustion space of the internal combustion engine, the air mass flow entering the combustion space during the induction phase is detected by means of a measuring appliance; and a fuel mass flow which is, at least at times, proportional to the air mass flow is injected into the combustion space by means of the injection valve. The proportionality relationship between the air mass flow and the fuel mass flow can, in this arrangement, be selected as a function of the load on the engine. In a modified example of this method, the needle lift is selected to be proportional to the air mass flow, this providing a fuel mass flow which depends on the opening characteristic of the injection valve.

The third example described for the method permits formation of a homogeneous air/fuel mixture, which is particularly desirable in the case of engine operation without layering of the charge, for example in full-load operation. The third example of the method according to the invention can precede one of the other two examples of the method or can be combined with them. All the examples shown for the method permit efficiency optimization of the internal combustion engine with internal mixture formation, improved ignition stability, reduced cyclical fluctuations and pollutant emissions and a high level of long-term stability by reducing carbonization in the combustion space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for forming an air/fuel mixture in a combustion space of an internal combustion engine, in which fuel is injected into the combustion space with a varying fuel mass flow during an operational cycle of the internal combustion engine, at least under determinable engine operating conditions, three-stage fuel injection occurring during a compression phase, said method comprising:

in a first injection step, injecting a main fuel quantity which depends on a load condition of the internal combustion engine, for the formation of a first mixture cloud;

in a second injection step, which follows directly the first injection step, injecting an additional fuel quantity, with a fuel mass flow which is smaller than a fuel mass flow provided in the first injection step; and in a third injection step, which follows directly the second injection step, injecting an ignition fuel quantity, with a fuel mass flow which is larger than the fuel mass flow provided in the second injection step, for the formation of a second mixture cloud;

wherein injection of the additional fuel quantity connects the second mixture cloud to the first mixture cloud.

2. The method according to claim 1, wherein fuel mass flows in the first and the third injection steps are of substantially of equal magnitude.

3. A method for forming an air/fuel mixture in a combustion space of an internal combustion engine during an operation of the engine, said method comprising:

injecting fuel into said combustion space during three temporally contiguous injection phases which collectively form a continuous injection cycle;

during a first injection phase of said continuous injection cycle, injecting a main fuel quantity which depends on a load state of the engine, forming a first mixture cloud in said combustion space;

during a second injection phase of said continuous injection cycle, which follows said first injection phase, injecting an additional fuel quantity, with a fuel mass flow rate which is smaller than a fuel mass flow rate provided in the first injection phase; and during a third injection phase, which follows said second injection phase, injecting an ignition fuel quantity, with a fuel mass flow rate which is greater than the fuel mass flow rate provided in the second injection phase.

4. In a method of forming an air/fuel mixture in a combustion space of an internal combustion engine, which method comprises a first injection step in which a main fuel quantity is injected, dependent on an operating state of the engine, forming a main fuel mixture cloud in said combustion space, and a subsequent injection step in which an ignition fuel quantity is injected, forming an ignition fuel mixture cloud in said combustion space, the further step of:

providing an additional injection step, which is between said first and subsequent injection steps, for forming an additional fuel mixture cloud inside said combustion space.

5. The method according to claim 4, wherein a fuel mass flow rate during said additional injection step is smaller than fuel mass flow rates during said first and subsequent injection steps.

6. The method according to claim 4, wherein said first injection step, said additional injection step and said subsequent injection step collectively form a temporally continuous fuel injection cycle during which fuel is injected into said combustion space.

* * * * *